United States Patent [19]
Harris et al.

[11] Patent Number: 5,893,904
[45] Date of Patent: Apr. 13, 1999

[54] SYSTEM AND METHOD FOR BROKERING THE ALLOCATION OF AN ITEM OF BUSINESS PROPERTY

[75] Inventors: Bradly R. Harris, Princeton; James B. Cue, II, Flower Mound, both of Tex.

[73] Assignee: Electronic Data Systems Corporation, Plano, Tex.

[21] Appl. No.: 08/663,961

[22] Filed: Jun. 14, 1996

[51] Int. Cl.[6] .................................................. G06F 17/60
[52] U.S. Cl. ......................... 705/27; 705/8; 705/26
[58] Field of Search ........................... 705/8, 7, 26, 28, 705/29; 395/228, 200.59

[56] References Cited

U.S. PATENT DOCUMENTS

| | | | |
|---|---|---|---|
| 4,310,883 | 1/1982 | Clifton et al. | 707/205 |
| 5,396,600 | 3/1995 | Thompson et al. | 705/28 |
| 5,627,973 | 5/1997 | Armstrong et al. | 705/10 |
| 5,664,109 | 9/1997 | Johnson et al. | 705/2 |
| 5,712,985 | 1/1998 | Lee et al. | 705/28 |
| 5,712,989 | 1/1998 | Johnson et al. | 705/28 |
| 5,724,575 | 3/1998 | Hoover et al. | 395/610 |
| 5,815,665 | 9/1998 | Teper et al. | 395/200.59 |

*Primary Examiner*—Allen R. MacDonald
*Assistant Examiner*—Romain Jeanty
*Attorney, Agent, or Firm*—Christopher W. Kennerly; L. Joy Griebenow

[57] ABSTRACT

In accordance with one embodiment of the present invention, a system (10) for confirming authorization for the allocation of an item of business property is coupled to a business database (44) containing business data for the item. A translate module (30) receives allocation data (14) for the item and generates query data that represents a first portion of the allocation data (14). A query module (32) coupled to the translate module (30) generates a query using the query data for submission to the business database (44). A transaction database (34) coupled to the translate module (30) and the query module (32) stores at least a portion of the allocation data (14) and a query response received from the business database (44). A confirm module (100) accesses the query response and the stored allocation data (14) to confirm authorization for the allocation.

20 Claims, 10 Drawing Sheets

FIG. 3

| # | Field | Value | |
|---|---|---|---|
| 203 | ALLOCATION | DONATION | |
| 204 | RECIPIENT | DISD | |
| 206 | ITEM NUMBER | T00000311 | |
| 208 | LOCATION | WW-35 | 202 |
| 210 | MANUFACTURER | HEWL/PACK | |
| 212 | PART NUMBER | 33440A | |
| 214 | SERIAL NUMBER | 2743J85944 | |
| 215 | ITEM VALUE | $295.00 | |
| | ... | | |
| 217 | SUBMITTER | CHRIS | |
| 218 | AUTHORIZER | LEE | |
| 219 | SUBMITTER ADDRESS | CHRIS @ SUBMITTER.COM | |
| 220 | AUTHORIZATION DATE | 06/01/96 | |
| 222 | AUTHORIZATION TIME | 14:23 | 216 |
| 223 | PROVISION DATE | 06/01/96 | |
| 224 | PROVISION TIME | 14:03 | |
| 225 | HISTORY | CHRIS; KEN; ART; LEE | |
| 226 | TRXN NUMBER | B00081 | |
| | ... | | |

200, 14

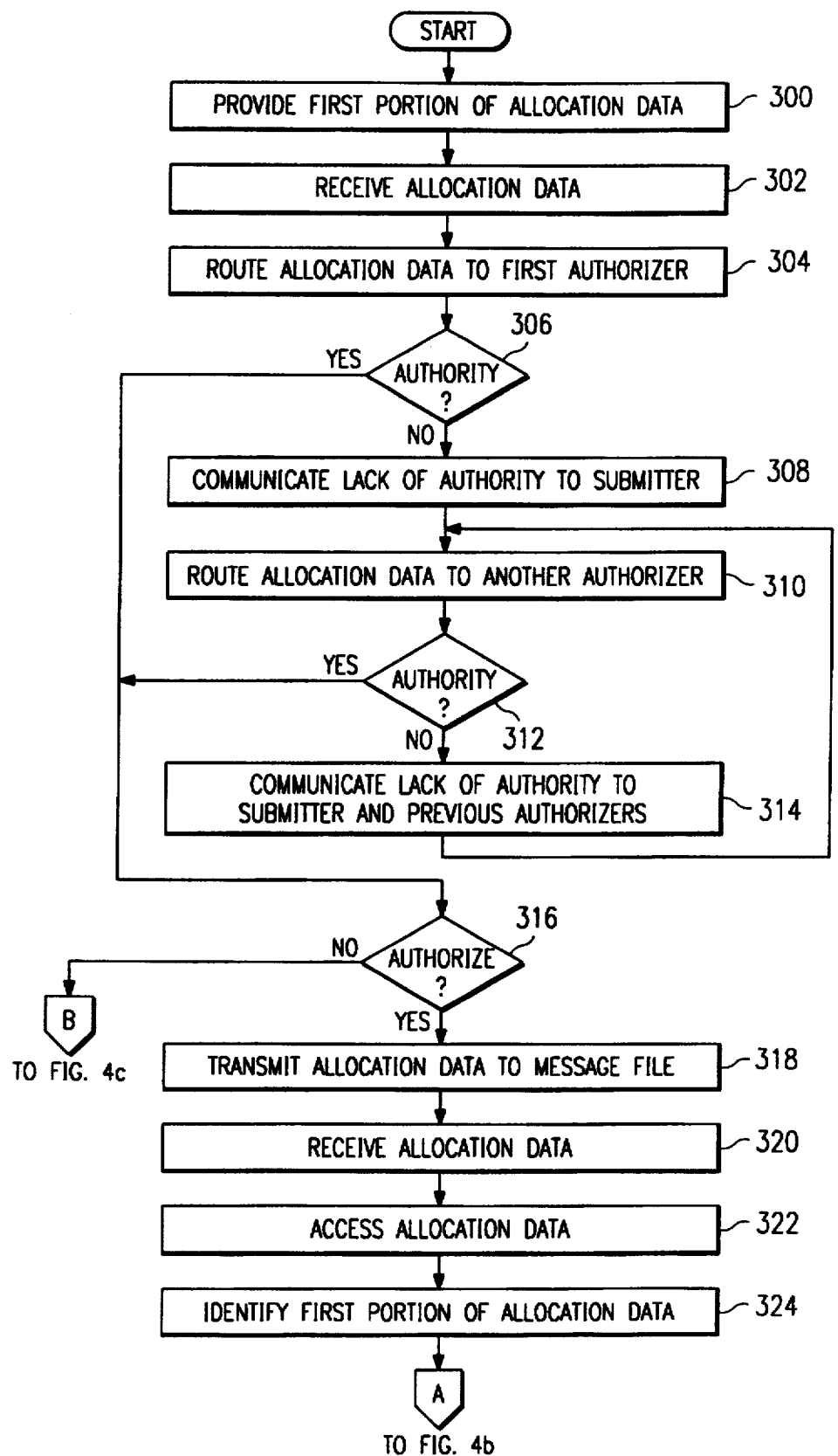

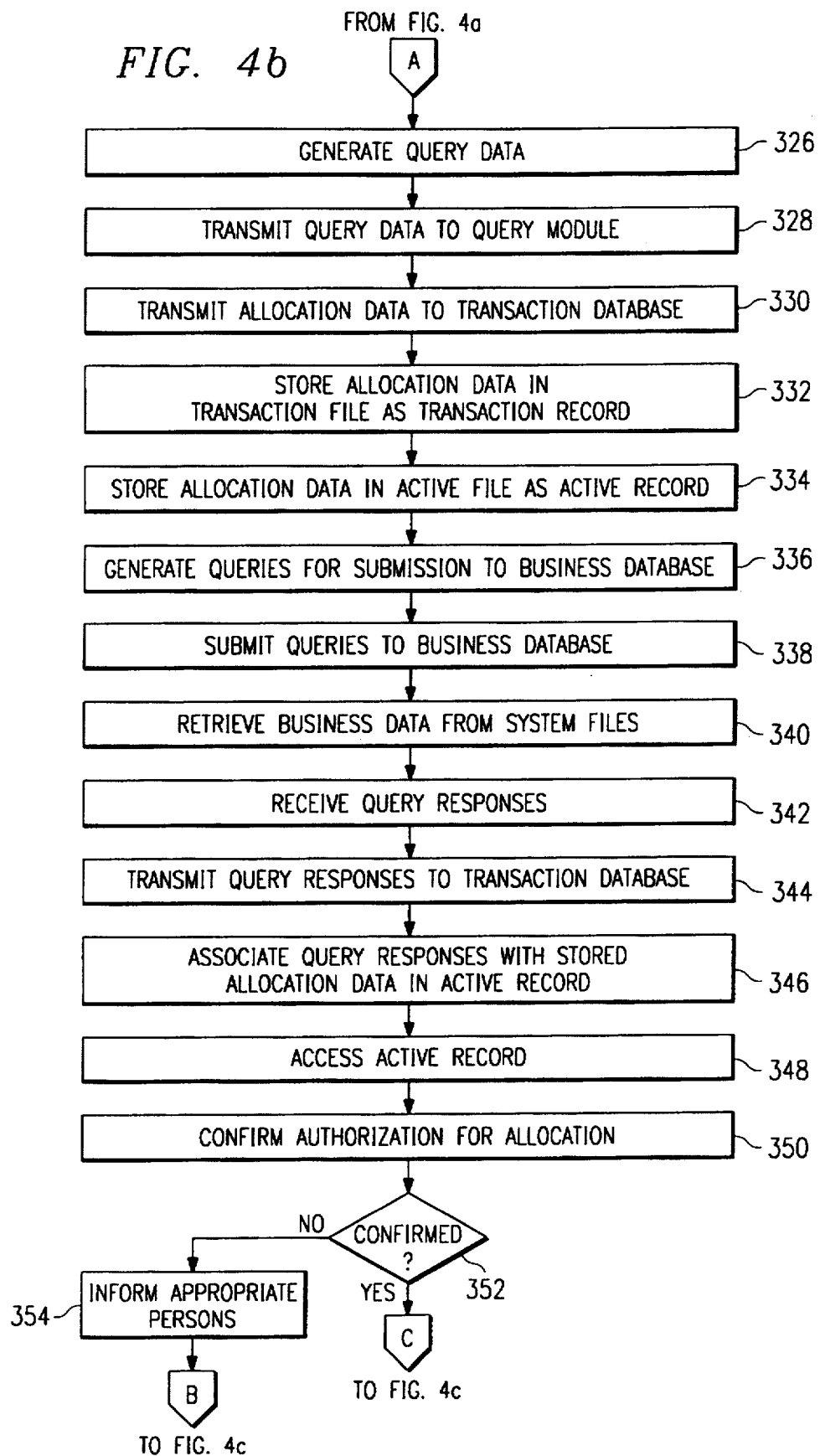

SYSTEM AND METHOD FOR BROKERING THE ALLOCATION OF AN ITEM OF BUSINESS PROPERTY

TECHNICAL FIELD OF THE INVENTION

This invention relates in general to the field of data communications, and more particularly to a system and method for brokering the allocation of an item of business property.

BACKGROUND OF THE INVENTION

Many organizations allocate selected items of business property to selected recipients according to the needs of the organization and the characteristics of the item and recipient. It is often desirable to allocate these items in response to information provided by a submitter. For example, a submitter might provide information to release products, retire assets, delete inventory, or obtain favorable tax consequences for the organization. The allocation of these items proceeds in accordance with this information.

As organizations become larger and more complex to serve a variety of customer and internal requirements, organizations may broker the allocation of selected items of business property using various techniques. A known technique for brokering the allocation of an item of business property uses manual submission, authorization, and accounting processes that are often relatively slow and labor-intensive. Information communicated by hard copy, facsimile, or telephone in connection with such techniques may be illegible, inaccurate, misdirected, or even lost. In addition, authorization for the allocation may be obtained inadequately, improperly, or not at all. As a result, brokering the allocation of an item may require several days, causing consequent backlogs and undesirable delays. Furthermore, organizations using such techniques may have little flexibility to support customer or internal time and space constraints.

SUMMARY OF THE INVENTION

In accordance with the present invention, the disadvantages and problems associated with systems and methods for brokering the allocation of items of business property have been substantially reduced or eliminated.

In accordance with one embodiment of the present invention, a system for confirming authorization for the allocation of an item of business property is coupled to a business database containing business data for the item. A translate module receives allocation data for the item and generates query data that represents a first portion of the allocation data. A query module coupled to the translate module generates a query using the query data for submission to the business database. A transaction database coupled to the translate module stores at least a portion of the allocation data and a query response received from the business database, the query response associated with the stored allocation data. A confirm module coupled to the transaction database accesses the query response and the stored allocation data to confirm authorization for the allocation.

Important technical advantages of the present invention include providing a system and method for brokering the allocation of an item of business property that incorporates automatic submission, authorization, and accounting processes to give organizations the ability to broker the allocation of items in an efficient, timely, and accurate manner.

The present invention decreases the transaction time for brokering the allocation of each item and may further decrease manpower requirements associated with the brokering process. The present invention also enhances the ability of the organization to respond to customer requirements and external or internal storage constraints. Other technical advantages are readily apparent to one skilled in the art from the following figures, descriptions, and claims.

BRIEF DESCRIPTION OF THE DRAWINGS

For a more complete understanding of the present invention and for further features and advantages thereof, reference is now made to the following description taken in conjunction with the accompanying drawings, in which:

FIG. 3 illustrates an exemplary input form containing allocation data;

FIGS. 4a through 4c are a flowchart of an exemplary method for brokering the allocation of an item of business property according to the present invention.

DETAILED DESCRIPTION OF THE INVENTION

Figure 1:
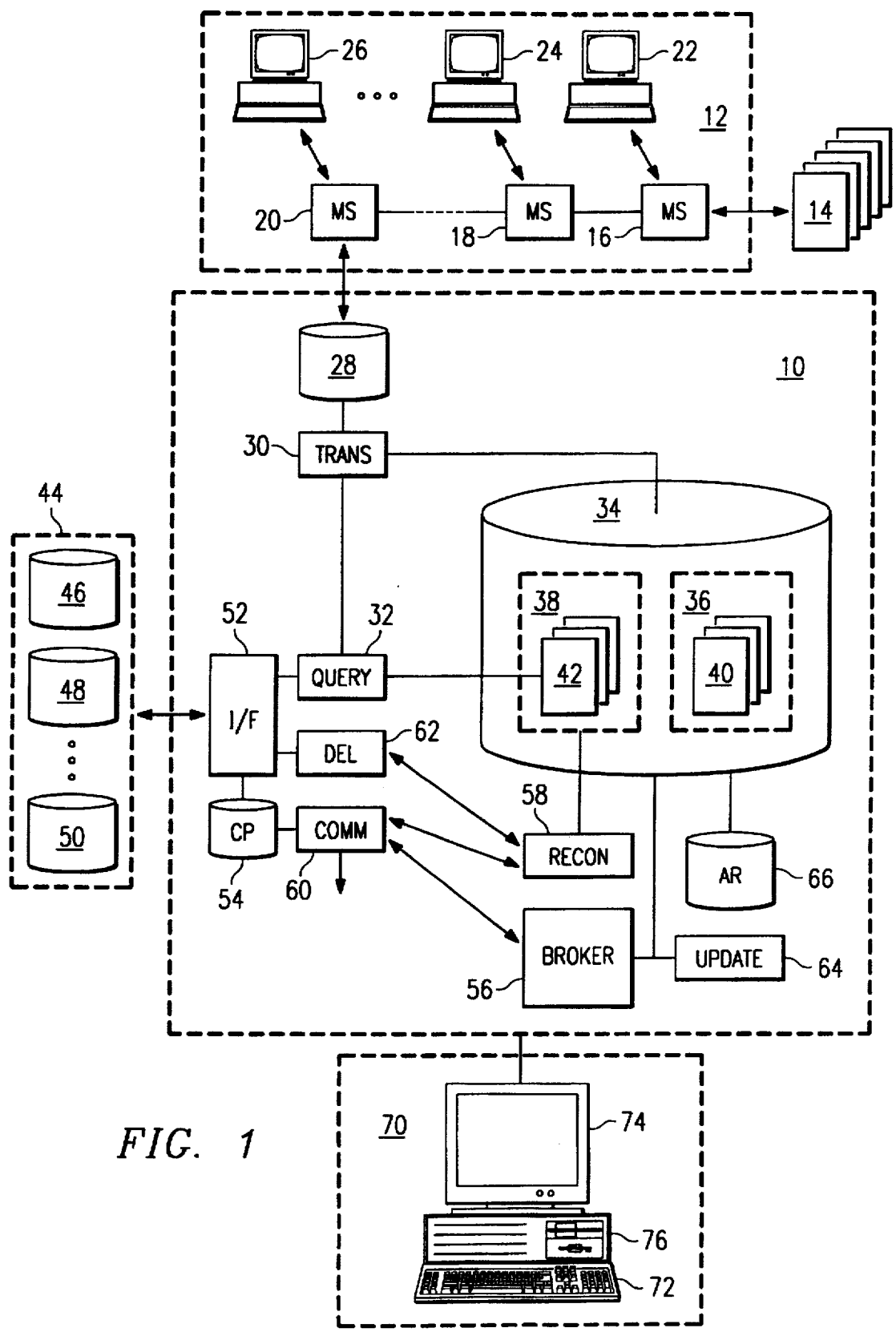
FIG. 1 illustrates an exemplary system for brokering the allocation of an item of business property according to the present invention.

FIG. 1 illustrates an exemplary system 10 for brokering the allocation of an item of business property. The item may be any tangible piece of equipment or other business property owned, leased, managed, maintained, or otherwise under the control or supervision of the organization or for which the organization may be responsible. Allocation refers generally to any suitable process for physically transferring an item from one or more individuals, groups, departments, or sites within an organization to a recipient within or outside the organization. Allocation of the item may be in the form of disposal, employee gift, donation, sale, or any other disposition suitable for brokering according to the needs of the organization. Brokering refers generally to any process for finding, identifying, associating, assigning, matching, or otherwise determining a recipient to which the item may be allocated in some suitable manner.

System 10 is coupled to a routing system 12 that receives allocation data 14 for the item from a submitter and routes allocation data 14 to one or more authorizers for authorization of the allocation. The submitter may be an employee, a manager, a supervisor, an executive, or any other person associated with the organization that desires to allocate the item. The authorizers are persons such as managers, supervisors, or executives that have the authority to authorize the allocation of the item, depending on the value or other characteristics of the item. Allocation data 14 may include any information suitable for authorizing and brokering the allocation of the item. Although at least a portion of allocation data 14 is provided by the submitter, allocation data 14 may also be generated by one or more authorizers, routing system 12, or any combination of one or more authorizers and routing system 12.

In one embodiment, the submitter provides a first portion of allocation data 14 for the item using an input form residing on routing system 12, and routing system 12 generates a second portion of allocation data 14 according to the routing of allocation data 14 and the authorization for the allocation. Routing system 12 may provide the submitter with one or more opportunities to select the manner in which the item is to be allocated, for example, by disposal, employee gift, donation, sale, or other suitable disposition. Routing system 12 may provide an input form to the submitter based on the selection or may provide a single input form suitable for any type of allocation.

The submitter may generate allocation data 14 for more than one item, using a single input form or multiple input forms. Where the allocation of more than one item is to be brokered, routing system 12 and system 10 may process allocation data 14 for each item in a serial fashion, more or less simultaneously, in a prioritized order, or in any other suitable manner. The relationship between allocation data 14 and the input form residing on routing system 12 and containing some or all of the allocation data 14 is discussed more fully below in connection with FIG. 3.

Routing system 12 may be any electronic mail or other communications system operating on one or more computers or other processing devices. Routing system 12 may include OFFICE VISION MAIL, LOTUS NOTES, MICROSOFT MAIL, an interactive web page, or any other suitable communications application or tool. Routing system 12 includes mail servers 16, 18, and 20 and authorization stations 22, 24, and 26. Mail servers 16, 18, and 20 are coupled to and interact with authorization stations 22, 24, and 26, respectively, and with each other to communicate information for authorizing the allocation of the item. Routing system 12 includes all hardware and/or software appropriate to receive, transmit, send, forward, reply to, store, archive, and otherwise communicate messages concerning allocation of the item between the submitter and authorization stations 22, 24, and 26 using mail servers 16, 18, and 20.

Mail servers 16, 18, and 20 are computers or other processing devices that manage communications between the submitter, the authorizers at authorization stations 22, 24, and 26, and system 10. Mail servers 16, 18, and 20 may also manage communications between routing system 12 and a network or other resource external to routing system 12 and system 10, using any suitable wireline or wireless link. Authorization stations 22, 24, and 26 are any logical entities in hardware and/or software, preferably such as miniframes or personal computers, that send and receive information using mail servers 16, 18, and 20, respectively. Although only mail servers 16, 18, and 20 and authorization stations 22, 24, and 26 are discussed, routing system 12 may include more or fewer mail servers and authorization stations, depending on the item, allocation data 14 for the item, the submitter, the authorizers, the organization, or any other suitable factor.

Routing system 12 may receive allocation data 14 from the submitter at any suitable location, mail server 16 being exemplary only. Mail server 16 routes allocation data 14 from the submitter to a first authorizer at authorization station 22. The submitter may provide allocation data 14 that instructs routing system 12 to route allocation data 14 to a particular first authorizer or routing system 12 may route allocation data 14 to a particular first authorizer automatically according to allocation data 14 and one or more specified parameters.

If the first authorizer at authorization station 22 does not have the authority to authorize the allocation of the item, authorization station 22 routes allocation data 14 to a second authorizer at authorization station 24 using mail servers 16 and 18. For example, if the value of the item exceeds a threshold value, the first authorizer may not have the authority to authorize the allocation of the item. In that case, allocation data 14 for the item is routed to the second authorizer at authorization station 24, who may be a manager or supervisor of the first authorizer and may therefore have the authority to and may authorize the allocation of the item.

Routing system 12 may inform the submitter that the first authorizer did not have the authority to authorize the allocation of the item, and may further inform the submitter concerning the scope of the first authorizer's authority. The submitter or first authorizer may provide allocation data 14 that instructs routing system 12 to route allocation data 14 to a particular second authorizer or routing system 12 may route allocation data 14 to a particular second authorizer automatically according to allocation data 14 and one or more specified parameters.

If the second authorizer at authorization station 24 does not have the authority to authorize the allocation of the item, authorization station 24 routes allocation data 14 to another authorizer using mail server 18 and a mail server and authorization station associated with that authorizer. Routing system 12 may inform the submitter, the first authorizer, or both, that the second authorizer did not have the authority to authorize the allocation of the item, and may further inform the submitter, the first authorizer, or both, concerning the scope of the second authorizer's authority. The submitter, first authorizer, or second authorizer may provide allocation data 14 that instructs routing system 12 to route allocation data 14 to another particular authorizer or routing system 12 may route allocation data 14 to the next authorizer automatically according to allocation data 14 and one or more specified parameters.

Routing system 12 continues to route allocation data 14 in this manner until allocation data 14 is routed, using mail server 20, to an authorizer who has the authority to authorize the allocation, for example, a third authorizer at authorization station 26. Each authorization station 22, 24, and 26 that receives allocation data 14 may automatically determine whether the authorizer at the authorization station 22, 24, or 26 has the authority to authorize the allocation of the item using allocation data 14 and one or more specified parameters. Alternatively, authorizers may determine whether the authorizers have the authority to authorize the allocation and, if not, to route allocation data 14 to another authorizer that may have such authority. The present invention contemplates one or more of the authorizers being computers or other processing devices to authorize the allocation or cause allocation data 14 to be further routed for authorization of the allocation.

If the allocation is authorized by the third authorizer at authorization station 26, as in the present example, mail server 20 transmits allocation data 14 to message file 28 of system 10, where allocation data 14 is stored for further processing. In addition to the first portion provided by the submitter, allocation data 14 may have a second portion generated by routing system 12 that includes, without limitation: a submitter identifier; an identifier for the authorizer that authorized the allocation of the item; the routing history for allocation data 14; a unique transaction number assigned to the item by routing system 12; and any other suitable information. The second portion of allocation data 14 is discussed more fully below in connection with FIG. 3. References to allocation data 14 are intended to include both the first and second portions of allocation data 14 or any part thereof, unless otherwise indicated.

Translate module (TRANS) 30 accesses the allocation data 14 contained in message file 28, identifies the first portion of allocation data 14 generated by the submitter, and generates query data for the item that represents the first portion of allocation data 14. In one embodiment, translate module 30 generates query data that duplicates some or all of the first portion of allocation data 14. Translate module 30 transmits the query data to query module (QUERY) 32 and transmits allocation data 14, in whole or in part, to transaction database 34.

Transaction database 34 includes a transaction file 36 and an active file 38. Transaction file 36 and active file 38 contain a transaction record 40 and an active record 42, respectively, for each item to be allocated. Transaction record 40 and active record 42 for each item are identified by the unique transaction number that is associated with the item by routing system 12. The transaction record 40 and active record 42 for each item contain allocation data 14 for the item, in whole or in part. As discussed below, active record 42 will also contain query responses for the item that are retrieved using queries and then associated with allocation data 14 for the item.

Query module 32 generates one or more queries, using the query data received from translate module 30, for submission to a business database 44. Business database 44 supports a database management system (DBMS) that manages access by system 10 to the resources of business database 44. Business database 44 contains one or more system files 46, 48, and 50 that contain business data concerning the items that the organization may wish to allocate at some time during the life of the items or organization. System files 46, 48, and 50 are one or more databases at a single or multiple locations that contain accounting, valuation, tax, inventory, tracking, and any other business data concerning the item that may be relevant to confirming the authorization for and brokering the allocation of the item using system 10. System files 46, 48, and 50 may be more or less permanent or may be temporary files created by extracting business data from more permanent files for use by system 10 in confirming the authorization for and brokering the allocation of one or more items, and in updating the more permanent files to reflect such brokering.

In one embodiment, system file 46 contains information concerning the fixed assets of the organization, such as tax information, net book values, original costs, strategic business unit (SBU) identities, and other suitable business data. System file 48 contains information concerning the inventory of the organization and the tracking of items not owned by the organization but for which the organization may incur maintenance and other expenditures. System file 50 is a recurring charge file that contains information concerning payments against assets such as lease payments, maintenance costs, license fees, and any other suitable business data related to the ongoing relationship between the organization and the item. Although only system files 46, 48, and 50 are discussed, the present invention contemplates business database 44 containing more or fewer system files according to the needs of the organization.

The queries submitted by query module 32 extract and retrieve business data concerning the item from system files 46, 48, and 50 that is pertinent to confirming the authorization for and brokering the allocation of the item.

In one embodiment, the queries are Structured Query Language (SQL) statements that provide instructions to business database 44 and its associated DBMS regarding the extraction of business data from system files 46, 48, and 50 and the subsequent handling of the extracted business data. Query module 32 submits the queries to business database 44 using an interface (I/F) 52 that is coupled to and interacts with business database 44 and its associated DBMS.

Interface 52 may be any mechanism suitable to allow query module 32 and business database 44 to communicate with one another. For example, interface 52 may include the appropriate hardware and software to communicate using a direct connection to a public switched telephone network, a connection through a local area network (LAN), wide area network (WAN), or other network, or any other suitable communications connection to access one or more databases or files at one or more locations. Interface 52 may also include protocol conversion and some data processing capabilities that allow interface 52 to facilitate data communications between query module 32 and business database 44.

Interface 52 accesses communication parameters 54 to communicate information with business database 44. For each system file 46, 48, and 50, communication parameters 54 maintain access information that may include, without limitation: a username; a password; a telephone number; communication port settings; database specifications; library and file names; directory paths; library and file paths; protocol information; and any other information suitable for submitting queries to and receiving query responses from business database 44.

Business database 44 and its associated DBMS execute the queries by retrieving the desired business data from system files 46, 48, and 50. The desired business data in the form of query responses is transmitted to query module 32 using interface 52. Query module 32 transmits the query responses to active file 38, where the query responses for the item are associated with allocation data 14 for the item in the corresponding active record 42. Transaction database 34 may support its own DBMS that manages access to the resources of transaction database 34, including transaction file 36 and active file 38, and manages the association of data with transaction records 40 and active records 42 corresponding to the particular items to be allocated.

Brokering capability (BROKER) 56 is coupled to and interacts with transaction database 34. For each item to be allocated, brokering capability 56 accesses the active record 42 in active file 38 to confirm the authorization for the allocation, using allocation data 14 and one or more confirmation parameters. Confirming authorization for the allocation may refer generally to any suitable process for verifying that some type of authorization for the allocation was obtained, whether or not the authorization is proper, adequate, complete, effective, permanent, or defective in some manner.

If the authorization is not confirmed, appropriate persons within the organization are notified. Appropriate persons may include the submitter, one or more of the authorizers, one or more managers, supervisors, or organization executives, or any other suitable person. If the authorization is confirmed, the allocation of the item is brokered in accordance with allocation data 14, the query responses, one or more brokering parameters, or any combination of these or other factors. One or more appropriate persons may then be informed that the allocation of the item was brokered and possibly of the identity of the recipient. Brokering capability 56 is discussed more fully below in connection with FIGS. 2a through 2d.

Update module (UPDATE) 64 is coupled to and interacts with brokering capability 56 and transaction database 34. After the allocation of the item has been brokered, update module 64 associates a completion indicator with the active record 42 for the item. Reconcile module (RECON) 58 periodically searches active file 38 for such completion indicators. If a completion indicator has been associated with the active record 42 for the item, reconcile module 58 generates a delete signal and one or more database format files. As discussed below, business data concerning the item may be deleted from system files 46, 48, and 50 in response to the delete signal.

The database format files generated by reconcile module 58 contain information that may be used to perform the allocation, retire the item, cancel maintenance agreements for the item, destroy inventory tags for the item, or perform some other suitable operation according to the practice of the organization. The database format files may be attached to electronic mail messages and transmitted to selected persons or processing devices within or outside the organization, including the submitter. In addition to the submitter, the selected persons may include persons inside or outside the organization interested in fixed assets, taxes, or payroll, the recipient to which the item was allocated, one or more of the authorizers, or any other suitable person. Reconcile module 58 exports the database format files for the item to the selected persons or devices using communications module (COMM) 60.

Communications module 60 is coupled to and interacts with an electronic mail or other suitable communications system to transmit the database format files for the item to the selected persons as attachments to electronic mail messages or in some other suitable manner. Communications module 60 may include appropriate hardware and software to communicate using a direct connection to a public switched telephone network, a connection through a local area network (LAN), wide area network (WAN), or other network, or any other suitable communications connection. Further, communications module 60 may include protocol conversion and data processing capabilities that allow communications module 60 to facilitate data communications between reconcile module 58 and selected persons or devices. Communications module 60 may also access one or more communications parameters 54 and may receive information concerning the selected persons from brokering capability 56 to transmit the database format files to the selected persons or devices. The present invention contemplates other communications devices, such as a facsimile machine, to replace or combine with the function and operation of communications module 60.

If a delete signal is generated, reconcile module 58 transmits the delete signal to delete module 62. In response to receiving the delete signal, delete module 62 instructs business database 44 and its associated DBMS to delete business data concerning the item from system files 46, 48, and 50. Like query module 32, delete module 62 uses interface 52 and communication parameters 54 to accomplish this task. The business data may be deleted from system files 46, 48, and 50 automatically in response to the delete signal, may be deleted by one or more of the selected persons using the information contained in the database format files, or both. For example, if one of the selected persons was responsible for retiring fixed assets, that person might use information contained in the exported database format files to retire the item and delete the corresponding business data from system file 46. The present invention contemplates updating business database 44 in any suitable manner to reflect the brokering of the allocation of the item.

After the brokering of the allocation of the item has occurred and the transaction corresponding to the item has been completed, the transaction record 40 for the item, the active record 42 for the item, or both are archived using archive database (AR) 66. The transaction record 40 may be archived at any time after the transaction corresponding to the item has been completed, while the active record 42 may be archived at any time after reconcile module 58 sweeps active file 38 and finds a completion indicator associated with active record 42. Transaction and active records 40 and 42, respectively, may be archived in any suitable form and in any suitable manner using archive database 66.

System 10 may operate on one or more computers 70 that are integral or separate from the hardware and software that support interface 52 and communications module 60. Computer 70 may include an input device 72, such as a keypad, touch screen, microphone, or other device that can accept information. An output device 64 may convey information associated with the operation of system 10, including digital or analog data, visual information, or audio information. Both input device 72 and output device 74 may include fixed or removable storage media, such as magnetic computer disks, CD-ROM, or other suitable media to both receive output from and provide input to system 10. Computer 70 may have a processor 76 and an associated volatile or non-volatile memory to execute instructions and manipulate information in accordance with the operation of system 10.

In operation, routing system 12 receives allocation data 14 for the item from the submitter and routes allocation data 14 for authorization of the allocation. Allocation data 14 may be routed successively to one or more authorization stations 22, 24, and 26, using mail servers 16, 18, and 20, until the allocation is authorized by an authorizer having the necessary authority. Allocation data 14 is then transmitted to system 10 and received by system 10 using message file 28.

Translate module 30 accesses allocation data 14 and generates query data for the item that represents a first portion of allocation data 14. Translate module 30 transmits the query data to query module 32 and transmits allocation data 14, in whole or in part, to transaction database 34. Transaction database 34 associates allocation data 14 for the item with a particular transaction record 40 in transaction file 36 and a particular active record 42 in active file 38 according to the unique transaction number associated with the item.

Query module 32 generates queries for the item using the query data and submits the queries to business database 44 using interface 52 and communications parameters 54. The queries extract and retrieve business data concerning the item from system files 46, 48, and 50 in the form of query responses. Query module 32 transmits the query responses for the item to transaction database 34, where the query responses are associated with allocation data 14 for the item in the corresponding active record 42.

Brokering capability 56 accesses the active record 42 for the item and confirms the authorization for the allocation using allocation data 14 and one or more confirmation parameters. If the authorization is not confirmed, one or more appropriate persons within the organization are informed. If the authorization is confirmed, allocation of the item is brokered in accordance with the query responses, allocation data 14, one or more brokering parameters, or any combination of these or other factors. Once the allocation of the item has been brokered, update module 64 associates a completion indicator with allocation data 14 for the item in the corresponding active record 42.

Reconcile module 58 periodically sweeps active file 38 to identify such completion indicators and, if a completion indicator is found, may generate one or more database format files, a delete signal, or both for the item. If one or more database format files are generated, reconcile module 58 transmits the database format files to selected persons who may then retire the item in some suitable manner using the information contained in the database format files. If a delete signal is generated, instead of or in addition to one or more database format files, the delete signal may be transmitted to delete module 62, which then automatically deletes business data concerning the item from system files 46, 48, and 50 in conjunction with interface 52 and business database 44. The transaction and active records 40 and 42, respectively, for the item are archived using archive database 66 at any appropriate time following brokering of the allocation of the item or identification of the completion indicator by reconcile module 58, respectively.

Figure 2A:
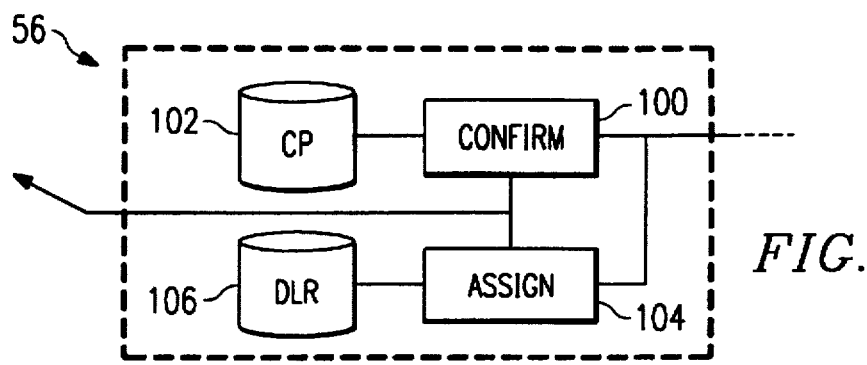
FIGS. 2a through 2d illustrate various brokering capabilities.

FIG. 2a illustrates brokering capability 56 for which allocation of the item includes disposal of the item. Confirm module (CONFIRM) 100 is coupled to and interacts with transaction database 34 and confirmation parameters 102. Confirm module 100 accesses the query responses and allocation data 14 contained in the active record 42 for the item, accesses confirmation parameters 102, and confirms the authorization for the disposal accordingly. For disposal, confirmation parameters 102 may include a maximum item value for which each authorizer or category of authorizers may authorize disposal.

If allocation data 14 indicates that the value of the item exceeds the maximum value for the authorizer that authorized the disposal, or if authorization for the disposal was never obtained, confirm module 100 prevents the disposal from being brokered and communicates this information to one or more interested persons using communications module 60. Such interested persons may include the submitter, one or more authorizers, one or more managers, supervisors, or executives of the organization, tax department personnel, or other appropriate persons.

If allocation data 14 indicates that the value of the item does not exceed the maximum value for the authorizer that authorized the disposal, the authorization is confirmed. Assign module (ASSIGN) 104 is coupled to and interacts with confirm module 100 and dealer parameters (DLR) 106. Dealer parameters 106 may include any information relevant to brokering disposal of the item to a selected dealer, including, without limitation: a listing of suitable dealers; their locations; an indication of their historical costs, timeliness, and reliabilities; or any combination of the above or other suitable information. Confirmation parameters 102, dealer parameters 106, or both, may be referred to as brokering parameters.

Assign module 104 receives the query responses and allocation data 14 from confirm module 100, accesses dealer parameters 106, brokers disposal of the item to a dealer accordingly, and notifies update module 64 that disposal of the item has been brokered to the particular dealer. One or more appropriate persons, including the submitter, may be informed using communications module 60 that disposal of the item was brokered to the particular dealer. The identity of the dealer may be associated with and archived along with allocation data 14 for the item in the corresponding transaction record 40, active record 42, or both. The present invention contemplates an appropriate person within the organization to select a dealer, broker the disposal of the item, and otherwise replace or combine with one or more operations of assign module 104 in some suitable manner.

Figure 2B:
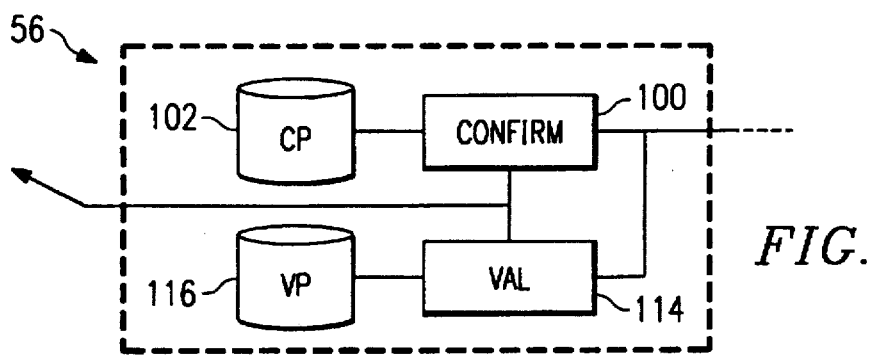

FIG. 2b illustrates brokering capability 56 for which allocation of the item includes gifting the item to an employee of the organization. As in FIG. 2a, confirm module 100 is coupled to and interacts with transaction database 34 and confirmation parameters 102 to confirm the authorization for the employee gift. For an employee gift, confirmation parameters 102 may include a maximum net book item value for which each authorizer or category of authorizers may authorize such a gift, a listing of eligible employees, and a maximum value for items that each employee or category of employees is eligible to receive.

If allocation data 14 indicates that the value of the item exceeds the maximum value for the authorizer or employee, the employee is ineligible to receive the gift, or if authorization for the gift was never obtained, confirm module 100 prevents the employee gift from being brokered and communicates this information to one or more interested persons using communications module 60. Such interested persons may include the submitter, one or more of the authorizers, one or more managers, supervisors, or organization executives, the employee, tax department personnel, or other appropriate persons. If allocation data 14 indicates that the value of the item does not exceed the maximum value for the authorizer or employee, the authorization is confirmed.

Valuation module (VAL) 114 is coupled to and interacts with confirm module 100 and valuation parameters (VP) 116. Valuation parameters 116 may include any information relevant to assigning a fair market value to the item, such as the net book value of the item, the original cost of the item, resale values for similar items, and any other suitable valuation information. Confirmation parameters 102, valuation parameters 116, or both, may be referred to as brokering parameters. Valuation module 114 receives the query responses and allocation data 14 from confirm module 100, accesses valuation parameters 116, assigns a fair market value to the item, brokers the item to the employee as an employee gift, and notifies update module 64 that the gifting of the item has been brokered to the particular employee.

One or more appropriate persons, including the submitter, may also be informed using communications module 60 that gifting of the item was brokered to the particular employee. The identity of the employee may be associated with and archived along with allocation data 14 for the item in the corresponding transaction record 40, active record 42, or both. The present invention contemplates an appropriate person within the organization to assign a fair market value to the item, broker the gifting of the item, and otherwise replace or combine with one or more operations of valuation module 114.

Figure 2C:
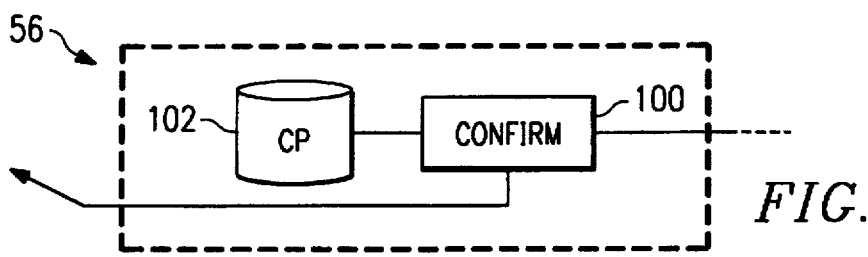

FIG. 2c illustrates brokering capability 56 for which allocation of the item includes donation of the item to a charitable organization or other suitable donee. As in FIG. 2a, confirm module 100 is coupled to and interacts with transaction database 34 and confirmation parameters 102 to confirm the authorization for the donation. For donation, confirmation parameters 102 may include a maximum item value for which each authorizer or category of authorizers may authorize donation, a listing of eligible or qualified donees, and a maximum value for items that each donee or category of donees is eligible to receive. Confirmation parameters 102 may be referred to as brokering parameters.

If allocation data 14 indicates that the value of the item exceeds the maximum value for the authorizer that authorized the donation, the donee is ineligible or not qualified, or if authorization for the donation was never obtained, confirm module 100 prevents the donation from being brokered and communicates this information to one or more interested persons using communications module 60. Such interested persons may include the submitter, one or more of the authorizers, one or more managers, supervisors, or organization executives, the donee, tax department personnel, or other suitable persons.

If allocation data 14 indicates that the value of the item does not exceed the maximum value for the authorizer or donee, the authorization is confirmed, donation of the item is brokered to the donee, and confirm module 100 notifies update module 64 that donation of the item has been brokered to the particular donee. One or more appropriate persons, including the submitter, may also be informed using communications module 60 that donation of the item was brokered to the particular donee. The identity of the donee may be associated with and archived along with allocation data 14 for the item in the corresponding transaction record 40, active record 42, or both. The present invention contemplates one or more persons within the organization to replace or combine with the functions and operation of confirm module 100 in some suitable manner.

Figure 2D:
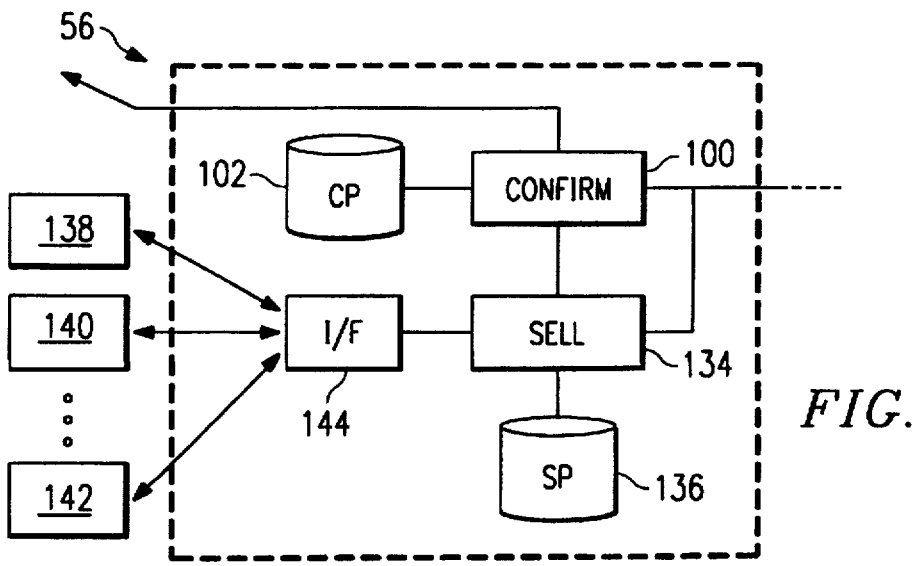

FIG. 2d illustrates brokering capability 56 for which allocation of the item includes selling the item to an external supplier, an existing customer, an organization employee, or other suitable buyer. As in FIG. 2A, confirm module 100 is coupled to and interacts with transaction database 34 and confirmation parameters 102 to confirm the authorization for the sale. For a sale, confirmation parameters 102 may include a maximum item value for which each authorizer or category of authorizers may authorize a sale.

If allocation data 14 indicates that the value of the item exceeds the maximum value for the authorizer that authorized the sale, or if authorization for the sale was never obtained, confirm module 100 prevents the sale from being brokered and communicates this information to one or more interested persons using communications module 60. Such interested persons may include the submitter, one or more of the authorizers, one or more managers, supervisors, or organization executives, or any other suitable persons. If allocation data 14 indicates that the value of the item does not exceed the maximum value for the authorizer, the authorization is confirmed.

Sell module (SELL) 134 is coupled to and interacts with confirm module 100 and sell parameters (SP) 136. Sell parameters 136 may include any information relevant to brokering the sale of the item to an external supplier, existing customer, employee, or other suitable buyer. For example, sell parameters 136 may include, without limitation: a listing of external suppliers, existing customers, or employees; their locations; their current or historical relationships with the organization; their historical reliabilities; communications information that sell module 134 may use to communicate with the suppliers, customers, or employees regarding the sale; and any other suitable information. Confirmation parameters 102, sell parameters 136, or both, may be referred to as brokering parameters.

For a sale to an existing customer or employee, sell module 134 receives the query responses and allocation data 14 from confirm module 100, accesses sell parameters 136, brokers the sale of the item accordingly, and notifies update module 64 that the sale of the item has been brokered to the particular customer or employee. One or more appropriate persons, including the submitter, may also be informed using communications module 60 that sale of the item was brokered to the particular customer or employee. The identity of the customer or employee may be associated with and archived along with the corresponding transaction record 40, active record 42, or both.

For a sale to an external supplier, sell module 134 receives the query responses and allocation data 14 from confirm module 100, accesses sell parameters 136, selects external suppliers 138, 140, and 142 accordingly, and requests bids from suppliers 138, 140, and 142 using interface 144. Interface 144 may include any hardware, software, processing and protocol conversion capabilities, or other applications or tools suitable for communicating with suppliers 138, 140, and 142 over any suitable wireline or wireless links. Although only suppliers 138, 140, and 142 are discussed, the present invention contemplates requesting and receiving bids from as many suppliers as are necessary or desirable.

Once bids are received from suppliers 138, 140, and 142 using interface 144, the sale of the item is brokered in accordance with the received bids. For example, if supplier 142 returned the highest bid during the period allotted to receive bids, sale of the item might be brokered to supplier 142. Sell module 134 then notifies update module 64 that sale of the item has been brokered to the particular supplier. One or more appropriate persons, including the submitter, may also be informed using communications module 60 that sale of the item was brokered to the particular supplier.

Some or all of the received bids, and the identity of the supplier 138, 140, or 142 that offered the winning bid, may be associated with allocation data 14 for the item in the corresponding transaction record 40, active record 42, or both. This information may be archived along with the transaction and active records 40 and 42, respectively. The present invention contemplates any suitable person within the organization to request and evaluate bids for the item, broker the sale of the item, and otherwise replace or combine with the operations of sell module 114 in some suitable manner.

FIG. 3 illustrates an input form 200 residing on routing system 12 and containing allocation data 14 for the item to be allocated. Input form 200 may suitable for any type of allocation, including disposal, employee gift, donation, sale, or other suitable disposition, or a particular input form 200 may be provided for one or more types of allocations according to a selection made by the submitter. Although only one item is discussed, input form 200 may contain allocation data 14 for a single item or for multiple items in any suitable form.

In one embodiment, input form 200 contains first portion 202 of allocation data 14 that is generated by the submitter and may include, without limitation: an allocation selection 203; a recipient identifier 204 that corresponds to an intended or preferred dealer, employee, donee, buyer, or other recipient, if one exists; an item number 206 that the organization may assign to the item; a location identifier 208 setting forth the location of the item; a manufacturer identifier 210; a manufacturer part number 212; a serial number 214 of the item; a net book or other value associated with the item; and any other suitable identification or other information concerning the item.

As discussed above in connection with FIG. 1, first portion 202 of allocation data 14 is received from the submitter and routed to one or more authorizers at authorization stations 22, 24, and 26 for authorization of the allocation. Input form 200 may also contain second portion 216 of allocation data 14 that is generated by routing system 12 according to the routing of the first portion 202 of allocation data 14 and the authorization of the allocation. The present invention contemplates some or all of first portion 202 and second portion 216 of allocation data 14 being identical, first portion 202 including some or all of second portion 216, second portion 216 including some or all of first portion 202, or any other suitable relationship between first portion 202 and second portion 216.

Second portion 216 of allocation data 14 may include, without limitation: a submitter identifier 217; an authorizer identifier 218; communications information 219 concerning the submitter or authorizer such as a telephone number, facsimile number, or network address; an authorization date 220; an authorization time 222; a provision date 223 regarding provision all allocation data 14 by the submitter; a provision time 224; a routing history 225 setting forth some or all of the persons, including the submitter and authorizers, who have received or handled allocation data 14; a unique transaction number 226 assigned to the item by routing system 12; and any other suitable tracking or other information concerning the item. First portion 202 and second portion 216 of allocation data 14 are transmitted to and received by system 10 using message file 28 for further processing.

Figure 4C:
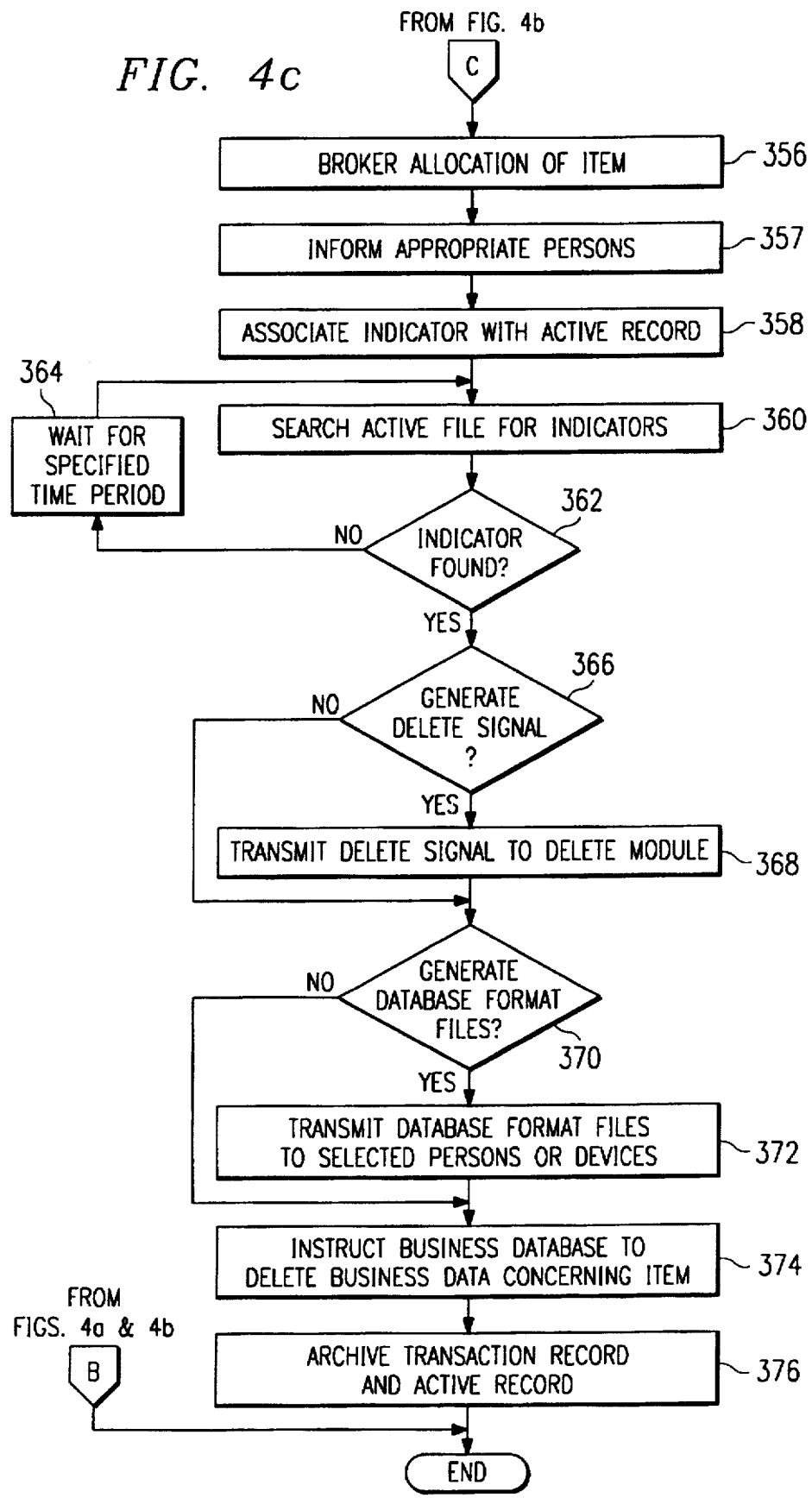

FIG. 4 is a flowchart of a method for brokering the allocation of an item of business property. The method begins at step 300, where first portion 202 of allocation data 14 for the item is provided by the submitter. Routing system 12 receives allocation data 14 at step 302 and routes allocation data 14 to the first authorizer for authorization of the allocation at step 304. The submitter may provide allocation data 14 that instructs routing system 12 to route allocation data to a particular first authorizer or routing system 12 may route allocation data 14 to the particular first authorizer automatically using allocation data 14 and one or more specified parameters. If the first authorizer has the authority to authorize the allocation of the item at step 306, the method proceeds to step 316, where the first authorizer may authorize the allocation.

If the first authorizer does not have the authority to authorize the allocation of the item at step 306, this lack of authority is communicated to the submitter and any other appropriate persons at step 308. At step 310, allocation data 14 is routed to another authorizer that may have the authority to authorize the allocation of the item. If the authorizer has the authority to authorize the allocation at step 312, the method proceeds to step 316. If the authorizer does not have the necessary authority at step 312, this lack of authority is communicated to the submitter, one or more previous authorizers, and any other appropriate persons at step 314.

The method then returns to step 310, where allocation data 14 is routed to another authorizer that may have the authority to authorize the allocation. The submitter or first authorizer may provide allocation data 14 that instructs routing system 12 to route allocation data to another particular authorizer or routing system 12 may route allocation data 14 to the next authorizer automatically using allocation data 14 and one or more specified parameters. The method continues in this manner until routing system 12 routes allocation data 14 to an authorizer that has the authority to authorize the allocation at step 312. This authorizer may or may not authorize the allocation of the item at step 316.

Each authorization station 22, 24, and 26 that receives allocation data 14 may automatically determine whether the authorizer at the authorization station 22, 24, or 26 has the authority to authorize the allocation of the item using allocation data 14 and one or more specified authorization parameters. Alternatively, authorizers may determine whether the authorizers have the authority to authorize the allocation and, if not, to route allocation data 14 to another authorizer that has such authority. Second portion 216 of allocation data 14 may be generated, in whole or in part, each time allocation data 14 is received at an authorization station 22, 24, or 26, is routed to another authorizer, or is authorized by one of the authorizers at step 316.

If the allocation is not authorized at step 316, the method ends. If the authorizer authorizes the allocation at step 316, routing system 12 transmits allocation data 14 to message file 28 of system 10 at step 318. Message file 28 receives allocation data 14 at step 320. Translate module 30 accesses the allocation data 14 contained in message file 28 at step 322. At step 324, translate module 30 identifies first portion 202 of allocation data 14 generated by the submitter. At step 326, translate module 30 generates query data for the item that represents first portion 202 of allocation data 14. In one embodiment, translate module 30 generates query data that duplicates some or all of the first portion 202 of allocation data 14. Translate module 30 transmits the query data to query module 32 at step 328, and transmits allocation data 14, in whole or in part, to transaction database 34 at step 330. Translate module 30 may transmit some or all of the allocation data 14 to transaction database 34 before, after, or simultaneous to the transmission of the query data to query module 32.

At step 332, transaction database 34 stores allocation data 14 in transaction file 36 as a particular transaction record 40 corresponding to the item. At step 334, transaction database 34 stores allocation data 14 in active file 38 as a particular active record 42 corresponding to the item. Transaction record 40 and active record 42 for each item may be identified by the unique transaction number 226 that is associated with the item by routing system 12. Allocation data 14 may be stored in transaction record 40 and active record 42 in any relative order and in any suitable manner.

At step 336, query module 32 generates one or more queries, using the query data received from translate module 30, for submission to business database 44. Query module 32 submits the queries to business database 44 at step 338 using interface 52 and possibly one or more communication parameters 54. At step 340, business database 44 and its associated DBMS retrieve the desired business data concerning the item from system files 46, 48, and 50 according to the submitted queries in the form of query responses. Query module 32 receives the query responses from business database 44 at step 342 and transmits the query responses to transaction database 44 at step 344. At step 346, transaction database 34 associates the query responses with allocation data 14 for the item stored in the corresponding active record 42 contained in active file 38.

At step 348, brokering capability 56 accesses the active record 42 for the item to be allocated. At step 350, brokering capability 56 confirms the authorization for the allocation, using allocation data 14 and one or more confirmation parameters. If the authorization is not confirmed at step 352, appropriate persons within the organization are informed at step 354 using communications module 60, and the method ends. If the authorization is confirmed at step 352, the allocation of the item is brokered at step 356 in accordance with allocation data 14, the query responses, one or more brokering parameters, or any combination of these or other factors. At step 357, one or more appropriate persons, including the submitter, may be informed using communications module 60 that allocation of the item was brokered to the particular recipient. The present invention contemplates an appropriate person within the organization to replace or combine with one or more operations of brokering capability 56. The operation of brokering capability 56 is discussed more fully below in connection with FIGS. 5a through 5d.

After the allocation of the item has been brokered at step 356, or after the appropriate persons have been informed at step 357, update module 64 associates a completion indicator with the active record 42 for the item at step 358, indicating that the numbered transaction corresponding to the item has been completed. Reconcile module 58 searches active file 38 for such completion indicators at step 360. If a completion indicator was associated with active record 42 at step 358, reconcile module 58 finds the completion indicator at step 362 and generates a delete signal at step 366 for transmission to delete module 62. If reconcile module 58 does not find a completion indicator at step 362, reconcile module 58 waits for a specified time period at step 364. When the specified time period has elapsed, reconcile module 58 again searches active file 38 for completion indicators at step 360. Reconcile module 58 continues to periodically search active file 38 for completion indicators in this manner until a completion indicator is found at step 362.

If reconcile module 58 generates a delete signal at step 366, reconcile module 58 may transmit the delete signal to delete module 62 at step 368. At step 370, reconcile module 58 may also generate one or more database format files containing information that may be used to retire the item, cancel maintenance agreements for the item, destroy inventory tags for the item, or perform some other suitable operation according to the practice of the organization. If a delete signal is not generated at step 366, the method proceeds directly to step 370. If reconcile module 58 does not generate one or more database format files at step 370, the method proceeds to step 374, where delete module 62 automatically instructs business database 44 to delete business data concerning the item from system files 46, 48, and 50.

If database format files are generated at step 370, reconcile module 58 exports the database format files to selected persons or processing devices within or outside the organization. In one embodiment, the database format files are attached to electronic mail messages transmitted to the selected persons or devices using communications module 60 and possibly one or more communications parameters 54. One or more of the selected persons may instruct business database 44 to delete business data concerning the item from system files 46, 48, and 50 at step 374. Business data may be deleted from system files 46, 48, and 50 automatically in response to the delete signal, may be deleted by one or more of the selected persons using the information contained in the database format files, or both. The present invention contemplates updating business database 44 in any suitable manner to reflect the fact that the allocation of the item has been brokered.

At step 376, the transaction record 40 corresponding to the item, the active record 42 corresponding to the item, or both may be archived using archive database 66. Transaction record 40 may be archived at any time after the transaction corresponding to the item has been completed at step 356, and active record 42 may be archived at any time after reconcile module 58 sweeps active file 38 and finds a completion indicator associated with active record 42 at step 362. After transaction record 40, active records 42, or both have been archived in some suitable manner at step 376, the method ends.

Figure 5A:
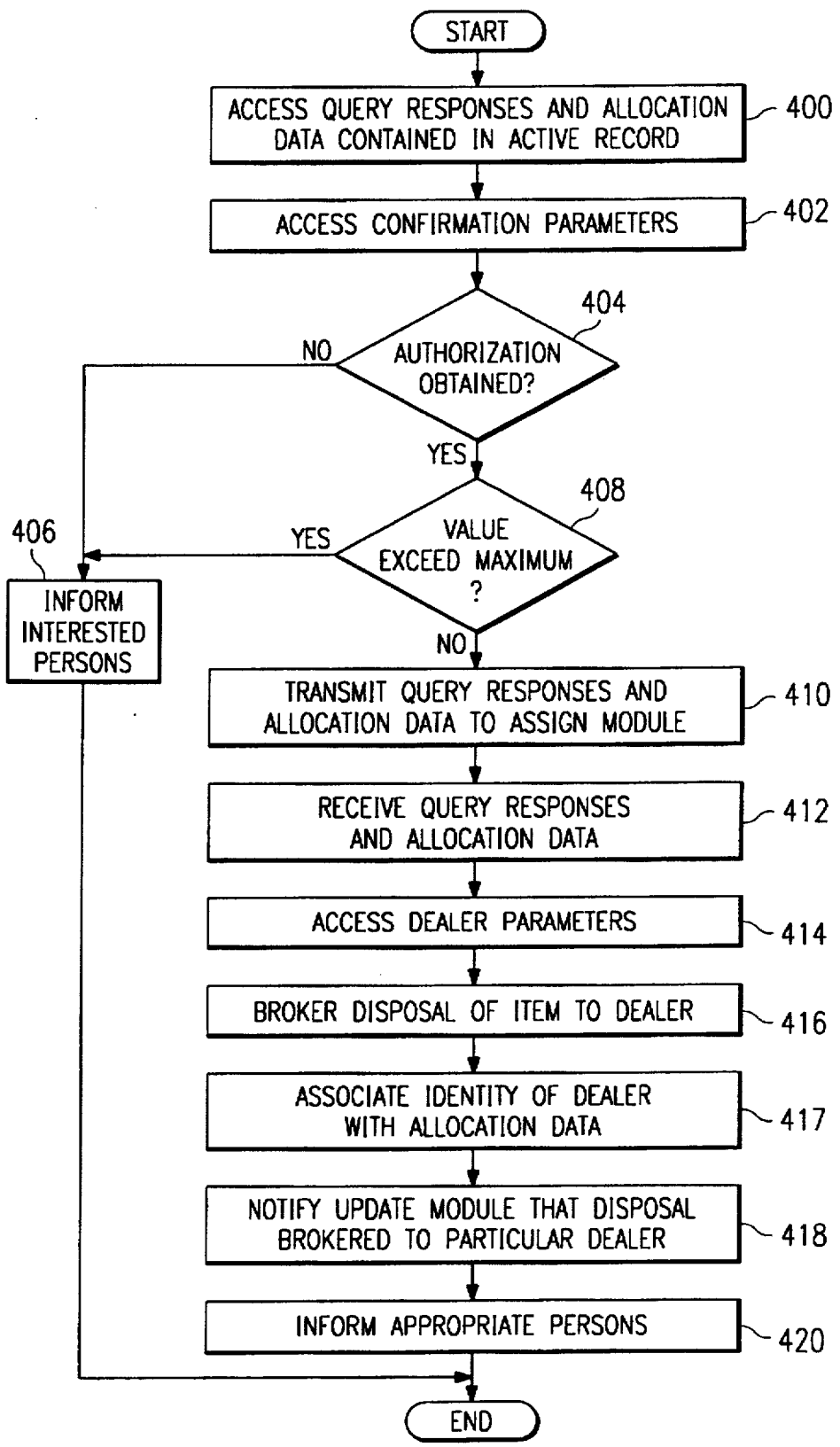
FIGS. 5a through 5d are flowcharts of methods of operation of various brokering capabilities.

FIG. 5a is a flowchart of a method of operation of a brokering capability 56 for which allocation of the item includes disposal of the item. The method begins at step 400, where confirm module 100 accesses the query responses and allocation data 14 contained in the active record 42 for the item. Confirm module 100 accesses confirmation parameters 102 at step 402. At step 404, if authorization for the disposal was never obtained, confirm module 100 prevents the disposal from being brokered and, at step 406, communicates this information to one or more interested persons using communications module 60. Even if the disposal was authorized at step 404, allocation data 14 may indicate, at step 408, that the value of the item exceeds the maximum value for which the authorizer that authorized the disposal has authority.

If allocation data 14 indicates that the value of the item exceeds the maximum value for the authorizer at step 408, confirm module 100 informs one or more interested persons at step 406 and the method ends. If allocation data 14 indicates that the value of the item does not exceed the maximum value for the authorizer at step 408, confirm module 100 transmits the query responses and allocation data 14 to assign module 104 at step 410. Assign module 104 receives the query responses and allocation data 14 from confirm module 100 at step 412 and accesses dealer parameters 106 at step 414. At step 416, disposal of the item is brokered to a dealer according to the query responses, allocation data 14, one or more dealer parameters 106, or any combination of these or other factors.

At step 417, the identity of the dealer may be associated with allocation data 14 for the item in the corresponding transaction record 40, active record 42, or both, and may later be archived with these records. Assign module 104 notifies update module 64 that disposal of the item has been brokered to the particular dealer at step 418. At step 420, one or more appropriate persons, including the submitter and the particular dealer, may be informed using communications module 60 that disposal of the item was brokered to the particular dealer. The present invention contemplates an appropriate person within the organization selecting a dealer, brokering the disposal of the item, and otherwise replacing or combining with one or more operations of assign module 104.

Figure 5B:
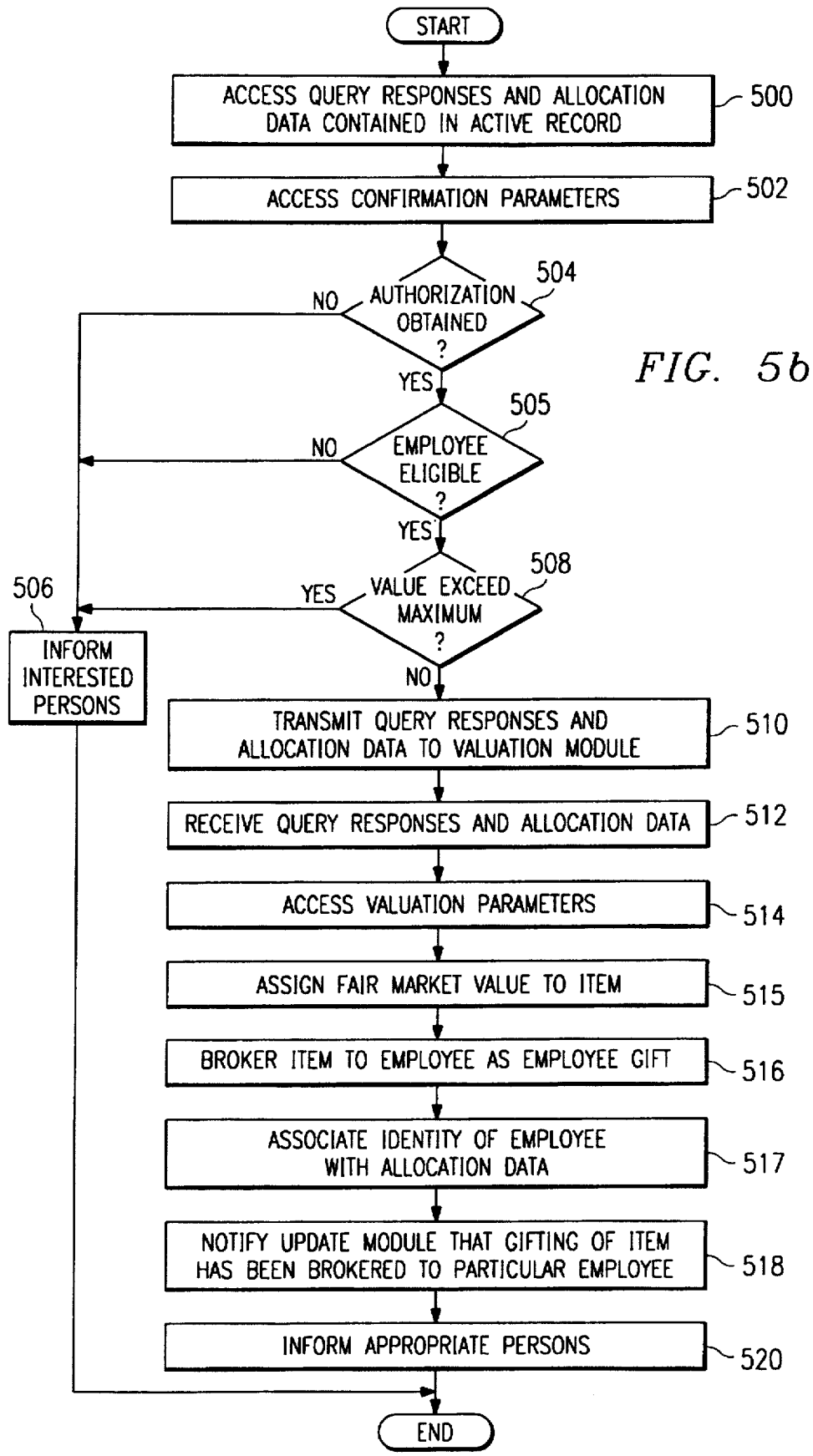

FIG. 5b is a flowchart of a method of operation of a brokering capability 56 for which allocation of the item includes gifting the item to an organization employee. The confirmation of the authorization for the employee gift illustrated in steps 500 through 508 is substantially similar to the confirmation for the disposal discussed above in connection with FIG. 2a and steps 400 through 408, with employee gift taking the place of disposal in the earlier discussion. In one embodiment, confirming the authorization for the employee gift includes determining, at step 505, whether the employee is eligible to receive the gift according to allocation data 14. If the employee is ineligible at step 505, this information is communicated to one or more interested persons using communications module 60 at step 506. If the authorization for the employee gift is confirmed, confirm module 100 transmits the query responses and allocation data 14 to valuation module 114 at step 510.

Valuation module 114 receives the query responses and allocation data 14 from confirm module 100 at step 512 and accesses valuation parameters 116 at step 514. At step 515, valuation module 114 assigns a fair market value to the item in accordance with the query responses, allocation data 14, one or more valuation parameters 116, or any combination of these or other factors. The brokering of the employee gift to the employee; the association of the identity of the employee with allocation data 14 for the item in the corresponding transaction record, active record 42, or both; the notification of update module 64 that the gift was brokered to the particular employee; and the notification of one or more appropriate persons such as the submitter and the particular employee that the gift was brokered to the particular employee, illustrated in steps 516 through 520, are substantially similar to the operations discussed above in connection with FIG. 2a and steps 416 through 420, with valuation module 114 taking the place of assign module 104 and employee taking the place of dealer in the earlier discussion. The present invention contemplates one or more appropriate persons within the organization brokering the gift of the item and otherwise replacing or combining with the operations of valuation module 114.

Figure 5C:
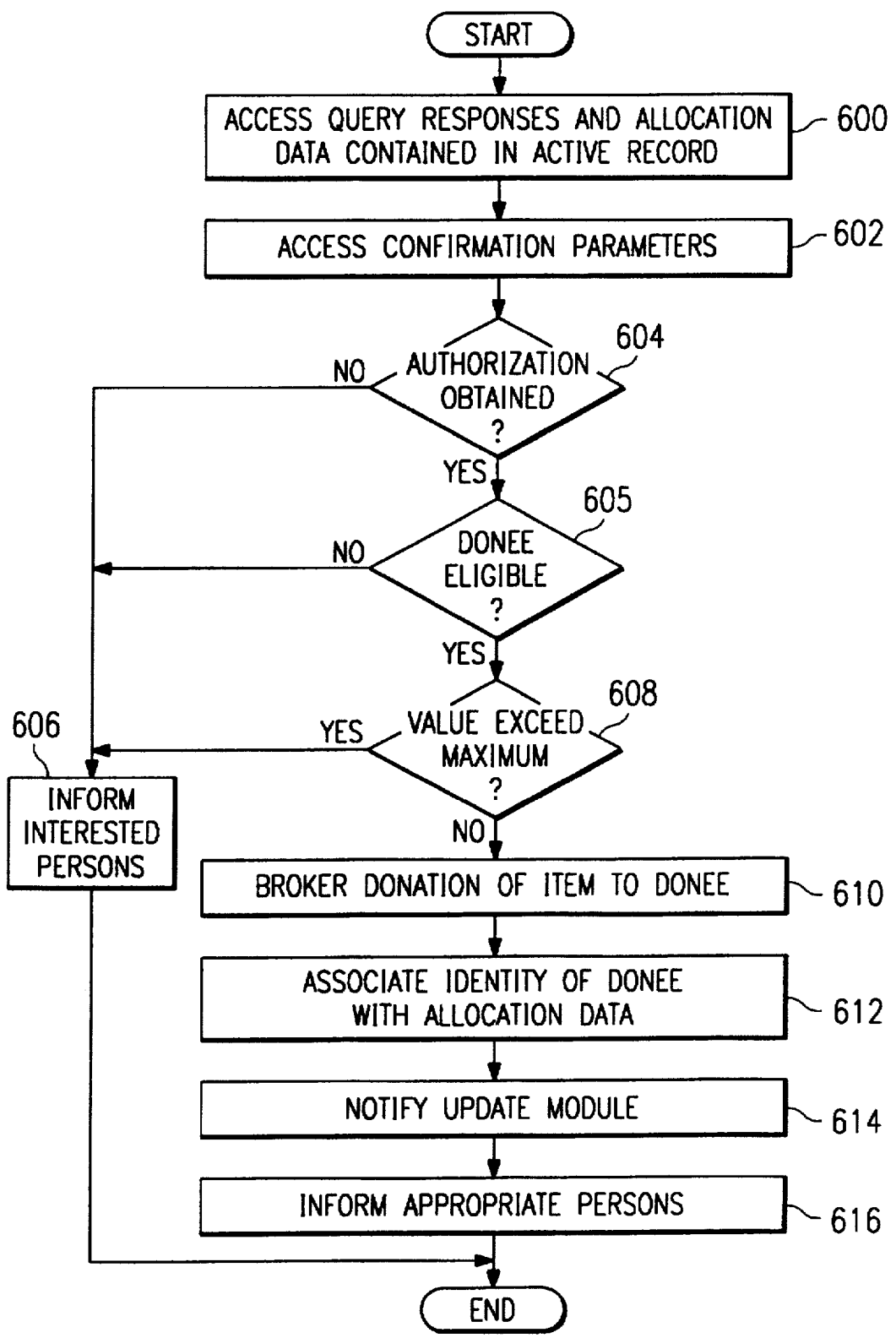

FIG. 5c is a flowchart of a method of operation of a brokering capability 56 for which allocation of the item includes donation of the item. The confirmation of the authorization for the employee gift illustrated in steps 600 through 608 is substantially similar to the confirmation for the employee gift discussed above in connection with FIG. 2b and steps 500 through 508, with donation taking the place of employee gift in the earlier discussion. If the authorization for the donation is confirmed, the donation of the item is brokered to the donee at step 610 in accordance with the query response, allocation data 14, one or more confirmation parameters 102, or any combination of these or other factors The association of the identity of the donee with allocation data 14 for the item in the corresponding transaction record, active record 42, or both; the notification of update module 64 that the donation was brokered to the particular donee; and the notification of one or more appropriate persons such as the submitter and the particular donee that the donation was brokered to the particular donee, illustrated in steps 612 through 616, are substantially similar to the operations discussed above in connection with FIG. 2b and steps 517 through 520, with confirm module 100 taking the place of valuation module 114 and donee taking the place of employee in the earlier discussion. The present invention contemplates one or more appropriate persons within the organization brokering the donation of the item and otherwise replacing or combining with the operations of confirm module 100.

Figure 5D:
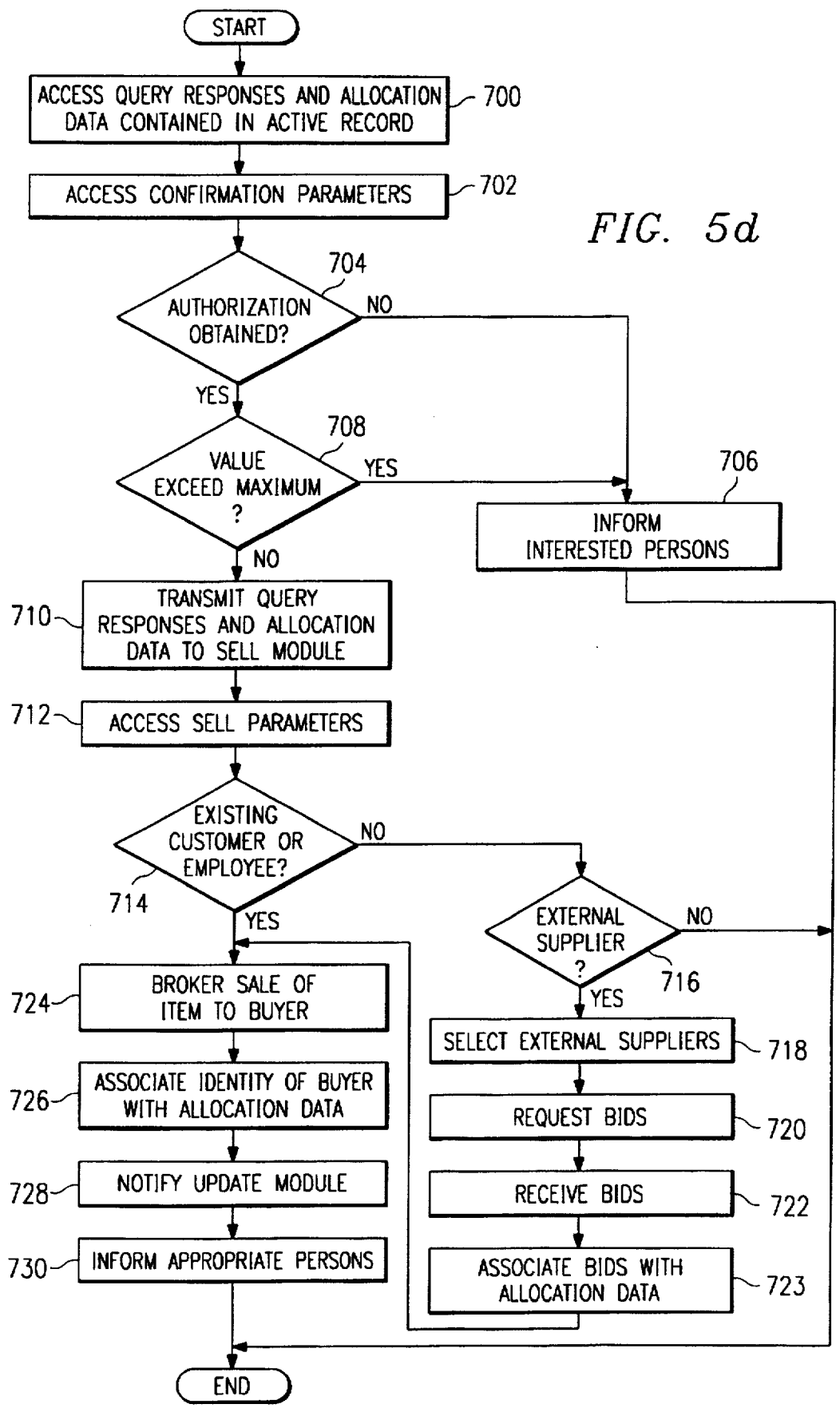

FIG. 5d is a flowchart of a method of operation of a brokering capability 56 for which allocation of the item includes selling the item to an external supplier, an existing customer, an organization employee, or other suitable buyer. The confirmation of the authorization for the employee gift illustrated in steps 700 through 708 is substantially similar to the confirmation for the disposal discussed above in connection with FIG. 2a and steps 400 through 408, with sale taking the place of disposal in the earlier discussion. If the authorization for the sale is confirmed, confirm module 100 transmits the query responses and allocation data 14 to sell module 134 at step 710.

Sell module 134 receives the query responses and allocation data 14 from confirm module 100 and accesses valuation parameters 116 at step 712. If the sale is to be brokered to an existing customer or employee at step 714, the method proceeds to step 724, where the sale of the item is brokered to the customer or employee in accordance with the query responses, allocation data 14, one or more sell parameters 136, or any combination of these or other factors. If the sale is to be brokered to an external supplier at step 712, sell module 134 selects external suppliers 138, 140, and 142 in accordance with the query responses, allocation data 14, one or more sell parameters 136, or any combination of the above. If the sale will neither be brokered to an existing customer or employee at step 714 nor to an external supplier at step 716, the method ends.

Bids are requested from suppliers 138, 140, and 142 at step 720, and received at step 722, using interface 144 and its associated resources. Although only suppliers 138, 140, and 142 are discussed, bids may be requested and received from as many suppliers as are necessary or desirable. Once the bids are received at step 722, the bids are associated with allocation data 14 for the item in transaction record 40, active record 42, or both at step 723. At step 724, sale of the item is brokered to one of the suppliers in accordance with the received bids. At step 726, the identity of the supplier that offered the winning bid is associated with allocation data 14 for the item in transaction record 40, active record 42, or both. Sell module 34 notifies update module 64 that sale of the item has been brokered to the particular supplier, at step 728, and informs appropriate persons, including the submitter and the particular supplier, of the same information using communications module 60 at step 730. The present invention contemplates one or more persons to replace or combine with the functions and operation of sell module 134.

Although the present invention has been described with several embodiments, a plethora of changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

What is claimed is:

1. A system operating on at least one computer for brokering the allocation of an item of business property to a recipient, the system coupled to a business database containing business data identified with the item, comprising:
   a translate module operable to receive allocation data for the item, the allocation data comprising a first portion comprising a recipient identifier and an item identifier, the allocation data comprising a second portion that comprises a submitter identifier, an authorizer identifier, and a unique transaction identifier for the item, the translate module further operable to generate query data for the item that represents the first portion of the allocation data;
   a query module coupled to the translate module and operable to generate a query using the query data for submission to the business database;
   a transaction database coupled to the translate module and operable to receive at least some of the allocation data from the translate module and to store the received allocation data in a record according to the unique transaction identifier for the item, the transaction database further operable to store a query response received from the business database in the record according to the unique transaction identifier for the item; and
   a broker module coupled to the transaction database and operable to access the query response and the allocation data stored in the record to confirm authorization for the allocation of the item and, in response, to broker the allocation of the item to the recipient.

2. The system of claim 1, wherein the first portion of the allocation data is provided by a submitter.

3. The system of claim 1, wherein the first portion of the allocation data comprises a recipient identifier and a plurality of item identifiers.

4. The system of claim 1, further comprising a routing system operable to route the first portion of the allocation data from a submitter to an authorizer.

5. The system of claim 4, further comprising a routing system operable to generate the second portion of the allocation data.

6. The system of claim 1, further comprising a reconcile module operable to generate a delete signal identifying the business data that is identified with the item and is to be deleted from the business database.

7. The system of claim 1, wherein the broker module is operable to confirm the authorization for the allocation according to a value associated with the item in the business database.

8. The system of claim 7, wherein the query response specifies the value associated with the item in the business database.

9. A method operating on at least one computer for brokering the allocation of an item of business property to a recipient, comprising:

receiving allocation data for the item, the allocation data comprising a first portion comprising a recipient identifier and an item identifier, the allocation data comprising a second portion that comprises a submitter identifier, an authorizer identifier, and a unique transaction identifier for the item;

generating query data for the item that represents the first portion of the allocation data;

generating, using the query data, a query for submission to a business database having business data associated with the item;

receiving at least some of the allocation data from the translate module; storing the received allocation data in a record according to the unique transaction identifier for the item;

receiving a query response from the business database;

storing the received query response in the record according to the unique transaction identifier for the item;

accessing the query response and the allocation data stored in the record;

confirming authorization for the allocation of the item in accordance with the accessed query response and allocation data; and brokering the allocation of the item to the recipient.

10. The method of claim 9, wherein the first portion of the allocation data is provided by a submitter.

11. The method of claim 9, further comprising:

routing the first portion of the allocation from a submitter to an authorizer.

12. The method of claim 9, wherein the first portion of the allocation data comprises a recipient identifier and a plurality of item identifiers.

13. The method of claim 9, wherein the authorization for the allocation is confirmed according to a value associated with the item in the business database.

14. The method of claim 9, further comprising the steps of deleting the business data identified with the item from the business database.

15. The method of claim 9, wherein the query response comprises a value associated with the item in the business database.

16. A method operating on at least one computer for confirming authorization for the allocation of an item of business property, comprising:

receiving a first portion of allocation data for the item from a submitter, the first portion comprising a recipient identifier and an item identifier;

routing the allocation data to an authorizer;

receiving a second portion of the allocation data for the item, the second portion comprising a submitter identifier, an authorizer identifier, and a unique transaction identifier for the item;

generating query data for the item that represents the first portion of the allocation data;

storing at least some of the second portion of the allocation data in a record according to the unique transaction identifier;

generating, using the query data, a query for submission to a business database having business data identified with the item;

receiving a query response from the business database;

storing the received query response in the record according to the unique transaction identifier;

accessing the query response and the allocation data stored in the record; and confirming authorization for the allocation of the item in accordance with the accessed query response and allocation data.

17. The method of claim 16, wherein the first portion of the allocation data comprises a recipient identifier and a plurality of item identifiers.

18. The method of claim 16, wherein a routing system generates the second portion of the allocation data.

19. The method of claim 16, further comprising the step of deleting the business data identified with the item from the business database.

20. The method of claim 16, wherein the query response comprises a value associated with the item in the business database.

* * * * *